Oct. 11, 1938.   G. DECKER   2,133,163
ELECTRIC HEATER
Filed June 22, 1935
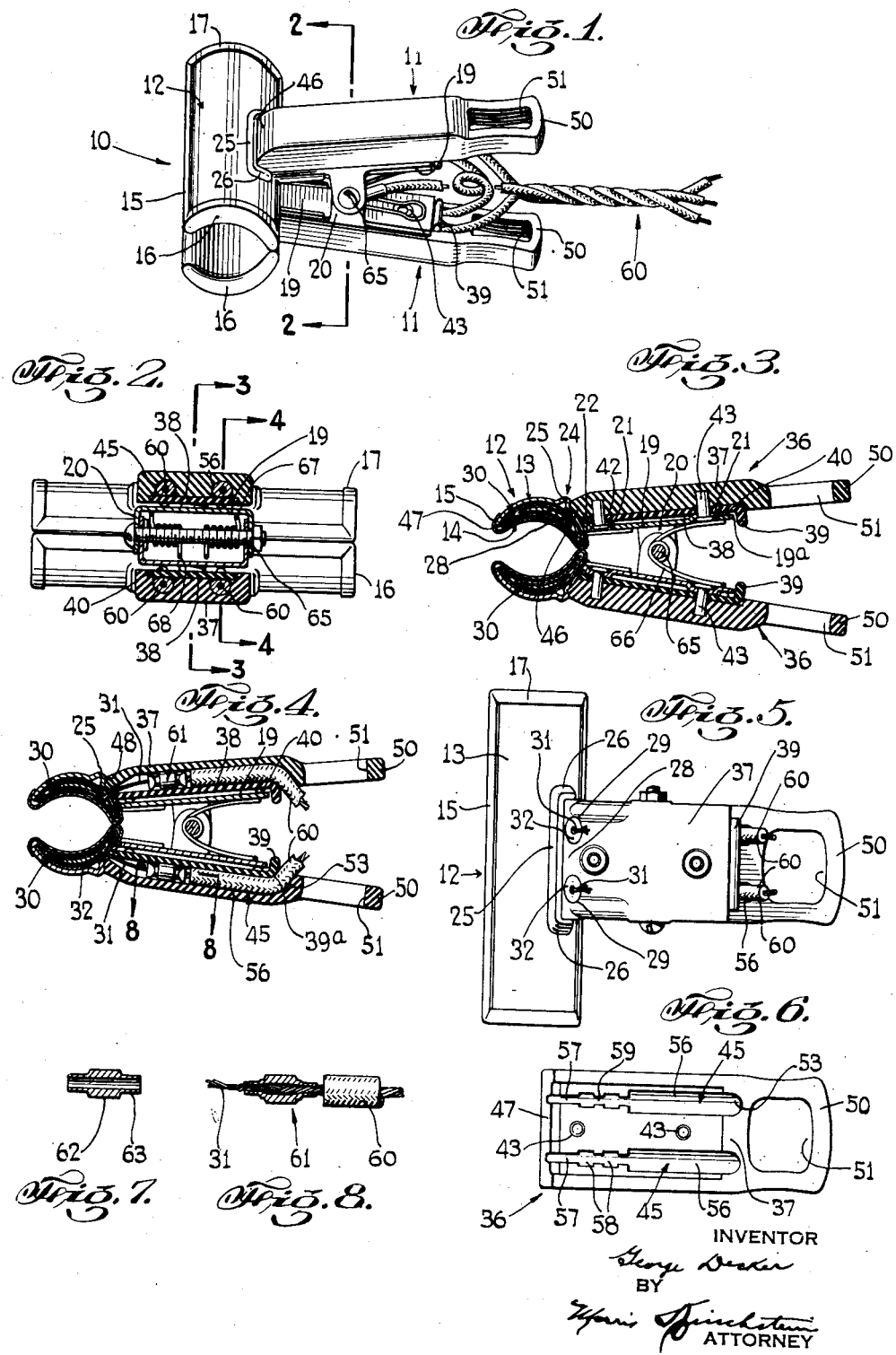
INVENTOR
George Decker
BY
Harris Finkelstein
ATTORNEY Patented Oct. 11, 1938

2,133,163

UNITED STATES PATENT OFFICE 2,133,163

ELECTRIC HEATER

George Decker, Cincinnati, Ohio

Application June 22, 1935, Serial No. 27,844

7 Claims. (Cl. 219—24)

This invention relates to electric heaters such for example as employed in permanent hair waving.

An object of this invention is to provide a heater of the character described having highly effective means to prevent short circuiting of the current carrying parts when the heater is applied, for example to a moistened wound strand.

A further object of this invention is to provide in a heater of the character described insulating handles which serve as housings for the electrical connections, and having highly improved means whereby the handles may be permanently attached to the casing so as to prevent disassembly of the parts or tampering of the electrical connections, thereby making the heater practical, foolproof and adapting it for long use without requiring repair.

Another object of this invention is to provide a neat, compact and rugged heater of the character described which shall be relatively inexpensive to manufacture, comprise few and simple parts, and which shall yet be practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a perspective view of the heater embodying the invention;

Fig. 2 is a cross-sectional view taken on line 2—2 of Fig. 1;

Fig. 3 is a cross-sectional view taken on line 3—3 of Fig. 2;

Fig. 4 is a cross-sectional view taken on line 4—4 of Fig. 2;

Fig. 5 is a top plan view of the heater with one of the insulating handles removed;

Fig. 6 is a plan view of the inner side of the insulating handle housing;

Fig. 7 is a longitudinal cross-sectional view of one of the terminals which connects the lead-in wire to the conductors; and Fig. 8 is a cross-sectional view taken on line 8—8 of Fig. 4.

Referring now in detail to the drawing, the heater 10 embodying the invention comprises a pair of substantially similar symmetrical members 11 hinged together as hereinafter described. Each member 11 comprises a casing 12 of curved cross section having an outer curved wall 13, and an inner curved wall 14 formed with longitudinal flanges 15 overturned along the longitudinal edges of said outer wall. Extending from said inner curved wall 14 are end walls 16 having inwardly turned flanges 17 folded over the end edges of the curved outer wall 13. Said wall 13 has an integral arm 19 formed with a pair of aligned, apertured ears 20 at the side edges thereof. The arm 19 has a pair of spaced depressed portions 21 apertured, as at 22, for the purpose presently to appear.

The casing wall 13 is formed with an outwardly pressed or raised ridge 24 having a portion 25 parallel to the inner end of arm 19, and portions 26 parallel to one another and extending from said portion 25 toward the inner edge of said wall. The portion 28 of the wall 13 disposed between the ridge 24 and the inner edge of said wall is formed with a pair of spaced openings 29.

Disposed within the casing 12 is an electric heating element 30 of suitable construction comprising a high resistance wire wound on a heat resisting member and having a pair of lead-in wires 31 extending through the openings 29. Heat and electric insulating washers 32 received within the openings 29 are formed with central openings through which the lead-in wires pass.

Attached to the arm 19 is a handle 36 made of heat and electric insulating material and comprising a housing portion 37 having a cover 38 on the inner face thereof and interposed between said housing and arm. The cover 38 comprises a flat plate of substantially the same size as the arm 19 but having a flange 39 at the outer end thereof extending at an angle thereto and overlying the outer edge 19a of said arm. The plate or cover 38 contacts the depressed portions 22 of the arm 19 and has a plurality of small lugs or projectors 40 on the inner surface thereof to space said cover from said arm. The contact between the cover plate and the arm is thus only at the depressed portions 21 and at the points of contact between the lugs 40 and said arm. The cover is provided with a pair of through openings 42 registering with the openings in the depressed portions 22, which said openings receive rivets 43 embedded in the housing portion 37 of the handle. Said housing portion is substantially flat and is provided with a pair of longitudinal recesses or grooves 45 on the inner face thereof covered by the cover 38, and has one end 46 contacting the portion 28 of the outer casing wall 13 and received within the recess formed by ridge portions 25, 26. Said end 46 of said housing has an inclined surface 47 contacting said casing wall portion 28 and a surface 48 adjacent surface 47, contacting the inner side of the ridge portion 25. It will be noted that the openings 29 in casing wall 13 are entirely covered by the ends 46 of the handle portions 37.

The housing portion 37 extends beyond arm 19 and cover plate 38 to provide a finger grip portion 50 formed with a central relatively large hole 51. The recesses or grooves 45 on the inner surface of said housing member 37 are parallel to one another and disposed on opposite sides of the mid-section of said housing and extend somewhat beyond the flange 39, as at 53, for the purpose hereinafter appearing.

Each of the grooves 45 comprises a relatively wide portion 56 at the outer end, a relatively narrow portion 57 at the inner end, and two spaced enlarged portions 58 interconnected by a relatively narrow portion 59. The lead-in wires 31 from the heating element pass into the groove portions 57. The conductors 60 to the source of power pass into the groove portions 56 through the ends 53 and are connected to the lead-in wires by terminal members 61. The conductors 60 contact the outer surface of the flanges 39, said flanges preferably being rounded, as at 39a, to prevent cutting into the insulation of the conductor wires. Each of said terminal members comprises a tube having a central thickened portion 62 and thinner outer ends 63. The outer ends 63 may be flattened or pressed together after the wires have been inserted into the terminal member, for firmly clamping said wires thereto. The terminal members are placed into the housing by inserting the thickened portions 62 thereof within the enlarged portions 58 of grooves 45, to prevent endwise movement of said terminal members.

The members 11 are hinged together by means of a central bolt 65 passing through the apertures in the overlapping ears 20. A torsion spring 66 on said bolt has a portion 67 contacting one arm 19 and a portion 68 contacting the other arm 19 for normally pressing the casing portions 12 together. Upon pressing against the finger grip portions 50 the casings may be separated for applying the heater to a strand of hair wound on a curler rod.

In giving permanent waves the wound strand of hair on the curler is usually treated with a softening or hair treating solution. The ridge 24 extending around the front and sides of the inner end of the casing prevents any of the solution from entering the casing or coming in contact with the lead-in wires 31. Short circuiting of the device is thus effectively prevented. The rivets 43 permanently attach the handles to the arms 19 with the covers 38 disposed between the housing 37 and said arms whereby the handles cannot be disassembled without breaking the same. Tampering with the electrical connections within the handles is thus effectively prevented.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. An electric hair waving heater comprising a pair of casings pivoted together, heating elements within said casings, insulating handles attached to said casings, said casings having portions receiving the adjacent ends of said handles, and portions pressed outwardly beyond the outer surface thereof forming ridges surrounding said handle ends and lead-in wires from said heating elements extending into said handles through said ends.

2. In an electric hair waving heater, a hollow casing of curved cross section having an arm extending therefrom, a cover overlying said arm, said cover having an angular flange at the outer end thereof overlying the outer edge of said arm, a substantially flat handle overlying said cover, and means for attaching said arm to said cover and handle, said handle having recesses on the surface thereof adjacent said cover, a heating element within said casing and lead-in wires from said wires extending into said recess.

3. In an electric hair waving heater a casing having a heating element therein, a flat arm integrally formed with and extending from said casing, said arm having a plurality of depressed portions formed with apertures, a cover overlying said arm and having apertures registering with the first apertures and contacting said depressed portions, a handle member overlying said cover and contacting the same, rivets extending through said registering apertures embedded within said handle member for attaching the latter to said arm, said cover having a flange at the outer end thereof overlying the outer end of said arm, said handle member having a pair of grooves in the surface adjacent the cover, extending beyond the flange portion of the cover, lead-in wires from the heating element extending into said grooves, conductor wires extending into said grooves and contacting the outer end of said cover, and means located within said grooves for connecting said lead-in wires and said conductor wires.

4. In an electric hair waving heater, a casing having a heating element therein, a flat arm integrally formed with and extending from said casing, said arm having a plurality of depressed portions formed with openings, a cover overlying said arm and having openings registering with the first openings and contacting said depressed portions, and a handle member overlying said cover and contacting the same, rivets extending through said registering openings embedded within said handle member for attaching the latter to said arm, said cover having a flange at the outer end thereof overlying the outer end of said arm, said handle member having a pair of parallel grooves on the surface adjacent the cover, extending beyond the flange portion of the cover, lead-in wires from the heating element extending into said grooves, and conductor wires extending into said grooves and contacting the outer end of said cover, and connected to said lead-in wires by terminal members located within said grooves, and means to prevent longitudinal movement of said terminal members within said grooves.

5. A hair waving heater adapted for use with a hair treating solution comprising a pair of interpivoted casings, electric heating elements within said casings, a handle attached to each casing, said casings having outwardly pressed raised wall portions forming a ridge surrounding and adapted to receive therein the inner ends of said handles, the lead-in wires from the heating elements extending into said handles, said ridge being so constructed and arranged whereby to prevent said solution from contacting said lead-in wires.

6. An electric hair waving heater adapted for use in connection with a hair treating liquid comprising a pair of casings having arms, means for pivotally interconnecting said arms, electric heating elements within said casings, substantially flat insulating handles attached to said arms, the inner ends of said handles contacting said casings, each casing being formed with a raised ridge having a portion parallel to the arm of said casing, and portions extending from the first portion toward said arm, said ridge forming a depression for receiving the inner end of the handle attached to said arm, the portions of the casings contacted by the handles having apertures therein, the lead-in wires for said heating elements extending through said apertures into said handles, whereby the said ridge serves to prevent the passage of said liquid from the outer surface of said casing to said lead-in wires.

7. A permanent wave heater adapted for use in connection with a hair treating liquid, comprising a pair of casings pivotally connected, heating elements within said casings, electrically insulated handles cooperating with said casings, electrical conductors leading from said heating elements and passing through said handles, and means whereby said electrical conductors are protected against contact with said treating liquid, said last named means comprising ridges on the outer surface of said casings surrounding the handle portions adjacent said casings.

GEORGE DECKER.